United States Patent
Joslin et al.

(10) Patent No.: US 6,272,483 B1
(45) Date of Patent: Aug. 7, 2001

(54) COST-OPTIMIZING ALLOCATION SYSTEM AND METHOD

(75) Inventors: David E. Joslin, Irving, TX (US); David P. Clements, Eugene, OR (US)

(73) Assignee: The State of Oregon acting by and through the State Board of Higher Education on Behalf of the University of Oregon, Eugene, OR (US)

( * ) Notice: Subject to any disclaimer, the term of this patent is extended or adjusted under 35 U.S.C. 154(b) by 0 days.

(21) Appl. No.: 09/183,026

(22) Filed: Oct. 29, 1998

Related U.S. Application Data
(60) Provisional application No. 60/065,410, filed on Oct. 31, 1997.

(51) Int. Cl.[7] ................................... G06N 3/08
(52) U.S. Cl. ................................... 706/62; 706/64
(58) Field of Search ................... 706/64; 705/7, 705/8

(56) References Cited

U.S. PATENT DOCUMENTS 5,343,388 * 8/1994 Wedelin ..................................... 705/8
5,649,113 * 7/1997 Zhu et al. ................................. 705/7

OTHER PUBLICATIONS

Weihai Chen; Qixian Zhang; Zhanfang Zhao; Gruver, W.A., Optimizing multiple performance criteria in redundant manipulators by subtask–priority control, Systems, Man and Cybernetics, 1995. Intelligent Systems for the 21st Century., IEEE International Confe, Jan. 1995.*

Harpal Maini, Kishan Mehrotra, Chilukuri Mohan and Sanjay Ranka; Genetic algorithms for graph partitioning and incremental grap partitioning; Proceedings of the conference on Supercomputing '94, 1994, pp. 499–457, Jan. 1995.*

* cited by examiner

*Primary Examiner*—Kakali Chaki
*Assistant Examiner*—Wiblert L. Starks, Jr.
(74) *Attorney, Agent, or Firm*—Fenwick & West LLP

(57) ABSTRACT

A system for determining schedules and processing other optimization problems includes a local optimization engine and a global optimization engine. The local optimization engine operates based on heuristics, and includes a prioritizer, a constructor, and an analyzer to make large "coherent" moves in the search space, thus helping to avoid local optima without relying entirely on random moves. The global optimization engine takes the individual schedules produced by the local optimization engine and optimizes them using Linear Programming/Integer Programming techniques.

24 Claims, 3 Drawing Sheets

COST-OPTIMIZING ALLOCATION SYSTEM AND METHOD

CROSS-REFERENCE TO RELATED APPLICATION

This application claims the benefit of U.S. Provisional Application No. 60/065,410, filed on October 31, 1997.

STATEMENT AS TO RIGHTS TO INVENTIONS MADE UNDER FEDERALLY SPONSORED RESEARCH AND DEVELOPMENT

The present invention is a subject invention under contracts F49620-96-1-0335, F30602-95-1-0023, F30602-97-1-0294, CDA-96-9625755, and DMI-9700285 with the United States Government, and as such the United States Government has rights therein.

BACKGROUND OF THE INVENTION

1. Field of the Invention

This invention relates to computerized information management and, more particularly, to systems and methods of optimization that can be used independently or as part of a hybrid global/local approach.

2. Description of the Related Art

A class of problems known as "Optimization Problems" arises often in diverse areas such as resource allocation, event planning, and the like. These problems are characterized in having a set of elements and a set of possible resources, and in calling for a particular assignment of elements to resources that approaches optimality in some measurable manner. Processes using artificial intelligence (AI) techniques have been applied to such optimization problems to find solutions.

"Elements," as used herein, refers to a set of things, such as tasks, variables, or people, that is assigned to one or more resources. For example, elements may be tasks or people in a scheduling problem or variables in a register allocation problem. "Resources," in contrast, refers to a set of things to which the elements are assigned. For example, resources may be manufacturing lines capable of performing tasks, doctors capable of meeting with patients, or registers capable of holding variables. In general, the set of resources is relatively fixed and defines the domain of the problem while the set of elements typically changes for each problem instance. In the example of patients and doctors described above, the set of patients (elements) may change every day, but the set of doctors (resources) remains relatively stable.

Other optimization problems include planning feasible schedules for meetings, assisting scientists in interpreting images from artificial vision devices, and even allowing cartographers to select colors for countries or other municipal areas when designing maps. A particular example of an optimization problem is scheduling a manufacturing process for fiber optic cables. This type of problem features multiple tasks/jobs and multiple manufacturing lines on which jobs can be run. Each job corresponds to a cable to be made, and each cable has certain characteristics that affect how and when it can be manufactured. These include a release time, a deadline, and a length for each job.

Continuing with this example, each line may have different characteristics affecting which cables can be made on each, and how fast each line is. Furthermore, there is a changeover cost between any two adjacent jobs on a given line. A goal for such a sample problem might be to minimize lateness (missed deadlines) and changeover costs.

This type of optimization problem may be decomposed into subproblems involving subschedules for the individual lines. It is desirable in such a problem to find a assignment of line schedules that have each job scheduled exactly once and to do so with minimal cost.

Optimization problems are related to another set of problems known as constraint-satisfaction problems, or CSPs. One approach to dealing with such problems uses artificial intelligence (AI) search techniques in one of two ways. The first way is known as "systematic" because under this approach, every possible set of element-resource pairings is eventually considered, unless a set of pairings that meets all of the constraints is found at some point in the process. These processes often rely on maintaining a database of possible reasons why certain assignments, or groups of assignments, will not satisfy the constraints of the problem. The sets of reasons indicating assignments that do not work are commonly referred to as sets of "nogoods". When a process of this class fails to provide a set of workable assignments, one can be sure that no workable set of assignments exists. Numerous such systematic processes are known, for instance as described in M. L. Ginsberg, Dynamic Backtracking, *JOURNAL OF ARTIFICIAL INTELLIGENCE RESEARCH* 1:25–46, 1993.

The second way is known as "nonsystematic" and is typically faster to find a solution. However, because processes of this class do not keep track of whether they have considered all possible sets of element-resource pairings, where such processes do not yield a solution, one cannot know whether a workable set of assignments exists but has not been found, or whether no workable set of assignments exists. A well-known example of such a nonsystematic technique is the GSAT technique, now known under an improved version as WSAT and described in B. Selman, et al., Local Search Strategies for Satisfiability Testing, *PROCEEDINGS 1993 DIMACS WORKSHOP ON MAXIMUM CLIQUE, GRAPH COLORING, AND SATISFIABILITY*, 1993.

Several other known strategies within these two broad classes of processes have been employed to solve CSPs.

One known process is to simply apply a heuristic, or "rule of thumb," and to see whether the heuristic results in an acceptable solution. One such heuristic might be: If machine A is available, use it; otherwise if machine B is available use it; otherwise if machine C is available use it; otherwise wait for machine A to finish and then use it. In some instances, such a technique works very well and provides a simple solution. When the heuristic fails, however, alternate techniques must be used.

One possible alternate scheme, known as iterative sampling, or isamp, involves following random paths, or probes, from a starting point to a candidate solution until eventually a path leading to an acceptable solution is discovered. At each node on a path, one of the successor nodes is selected at random and followed; next, one of the successors to that node is selected, and so on, until either a "goal node", i.e., acceptable solution, or a dead end is reached. If a path terminates at a dead end, a new probe is begun from the original starting point.

This process samples with replacement, resulting in a uniform chance of finding a goal node on any particular probe. Accordingly, the probability of achieving a goal node progresses uniformly to 1 as the number of probes grows without limit.

Iterative sampling works well in applications exhibiting high solution densities, but not otherwise.

Another scheme, known as "backtracking," uses the heuristic approach as far as possible. When the heuristic is found to fail, the last decision before the failure is changed, unless all possible changes at that point have already been tried. If they have, the decision prior to that is changed, and so on. This process works well where heuristics early in the process are more reliable than those later in the process, because it does not revisit the earliest decisions until all of the subsequent paths have been found to fail. Unfortunately, in most real-world problems, heuristics generally become more reliable as a solution is approached and the problem is reduced in size.

Similarly, a number of approaches have been developed for processing optimization problems. As with CSP, heuristic approaches have been widely used, and have the advantage of speed and scalability (i.e., ability to handle problem instances of increasing size gracefully). Exact approaches, on the other hand, often provide results that are closer to the theoretically optimal results, but require much more time-consuming processing to do so.

The Operations Research (OR) community has a history of successfully solving large optimization problems that can be formulated as Linear Programming/Integer Programming (LP/IP) problems. For truly large problems, it is not computationally possible to pass a full definition of a problem (all possible rows and all possible columns) to an LP/IP engine. To even enumerate, let alone solve, such large problems would take more resources than feasible for many commercial purposes.

The particular type of problem described above is somewhat decomposable into subproblems, but is not fully decomposable because there is interaction among the subproblems. This class of problem allows for parts of different solutions to be recombined to form new solutions. Typical OR approaches to such problems begin with generating one or more initial solutions using heuristic methods. These initial solutions may range from poor to good in quality, but are usually far from optimal. These initial heuristic solutions are used to "seed" an LP/IP engine, and the process of generating this initial set of solutions is known as "seeding."

The engine then solves the problem based on the initial, or "seed," solutions. It recombines parts of the various initial solutions to provide the best LP solution (and sometimes IP) that can be produced from those solutions. It also identifies in what parts of the problem the engine is having the hardest time finding a solution. This information about what parts are hard is then used as guidance in the next step of the process.

The next step in the conventional OR process is to divide the problem into its subproblems and then generate new solutions for each subproblem using the feedback from the previous call to the LP/IP engine. To reduce the complexity of the problem, the subproblems are solved in isolation from each other. The subproblem solutions attempt to address precisely those problems that were identified by the previous pass. These partial solutions are then fed back into the LP and the process repeats with the LP/IP engine identifying new problem areas on each iteration. This process of generating new subproblem solutions based on feedback from the LP/IP engine is called "new column generation." The process of generating new partial solutions is the heart of the traditional OR approach, but is also the weakest spot in that approach. Traditional methods spend most of their time doing new column generation (generating new partial solutions), and the quality of the partial solutions tends to be far from optimal.

The generation of new partial solutions has a large search component and that is where artificial intelligence (AI) methods become involved. It was hoped that AI techniques would be better at new column generation and thus would move the LP/IP engine towards better solutions faster than do existing OR techniques.

Numerous methods are known for processing optimization problems, as disclosed in the following references, which are hereby incorporated by reference for background information:

M. R. Garey and D. S. Johnson, Computers and Intractability: a Guide to the Theory of NP-Completeness, W. H. Freeman, 1979;

H. Kautz and B. Selman, Pushing the envelope: Planning, propositional logic, and stochastic search, in Proceedings of the National Conference on Artificial Intelligence, AAAI Press, Portland, Oreg., 1996;

James M. Crawford, An Approach to Resource Constrained Project Scheduling, in Artificial Intelligence and Manufacturing Research Planning Workshop, 1996;

Bart Selman, Henry A. Kautz and Bram Cohen, Local search strategies for satisfiability testing, in Cliques, Coloring, and Satisfiability: The Second DIMACS Implementation Challenge, Rutgers University, October, 1993;

B. Selman, H. Levesque and D. Mitchell, A new method for solving hard satisfiability problems, in Proceedings of the National Conference on Artificial Intelligence, pp. 440–446, 1992;

Gilbert P. Syswerda, Generation of Schedules using a Genetic Procedure, U.S. Pat. No. 5,319,781;

Barry R. Fox and Mark Ringer, Planning and Scheduling Benchmarks, available at http://www.NeoSoft.com/~benchmrx/, 1995;

Richard M. Stallman and Gerald J. Sussman, Forward Reasoning and Dependency-Directed Backtracking in a System for Computer-Aided Circuit Analysis, AI, 9:135–36, 1977;

E. Aarts and J. Korts, Simulated Annealing and Boltzman Machines, Wiley, 1989;

G. L. Nemhauser, M. W. P. Savelsbergh and G. C. Sigismondi, MINTO, A Mixed INTeger Optimizer, Operations Research Letters, 1994, 15:47–58;

G. L. Nemhauser and L. A. Wolsey, Integer and Combinatorial Optimization, Wiley, 1988;

G. B. Dantzig and P. Wolfe, Decomposition principle for linear programs, Operations Research, 8:101–111, 1960;

C. Barnhart, E. L. Johnson, G. L. Nemhauser, M. W. P. Savelsbergh and P. Vance, Branch-and-Price: Column Generation for Solving Huge Integer Programs, Operations Research, 1996;

CPLEX Optimization, Inc.; Using the CPLEX Callable Library and CPLEX Mixed Integer Library, Version 4.0, 1996;

F. Glover and M. Laguna, Tabu Search, Kluwer, 1997;

Thomas A. Feo and Mauricio G. C. Resende, Greedy Randomized Adaptive Search Procedures, Journal of Global Optimization, 6:109–133, 1995.

Despite the plethora of research and development in this area, there is still a need for improved solutions that provide faster and more accurate results to optimization problems. Known processes for handling optimization problems are all lacking in one way or another, and no known teaching provides an adequately robust process that does not suffer from any of these failings.

SUMMARY OF THE INVENTION

In accordance with the present invention, an optimization system includes a local optimization engine operating according to "Squeaky Wheel Optimization" ("SWO") in that it iteratively generates and modifies assignments based on trouble spots identified in each constructed assignment. The local optimization engine includes a prioritizer, a constructor, and an analyzer.

Also in accordance with the present invention, the global optimization engine uses a linear programming (LP) process to optimally combine the individual assignments generated by the local optimization engine. Each column in the LP represents a feasible solution to a subproblem such as a feasible schedule for a single production line in a multi-line facility.

A branch-and-bound solver is then used to obtain "good" integer solutions to the overall problem, i.e., finding the optimal combination of columns (line schedules) from the heuristically-generated schedules. Given a set of columns, the LP solver finds optimal primal and dual solutions to the LP relaxation.

Further in accordance with the present invention, an optimization system includes both a local optimization engine and a global optimization engine, the local optimization engine operating according to SWO and the global optimization engine operating according to an LP process.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENTS

Figure 1:
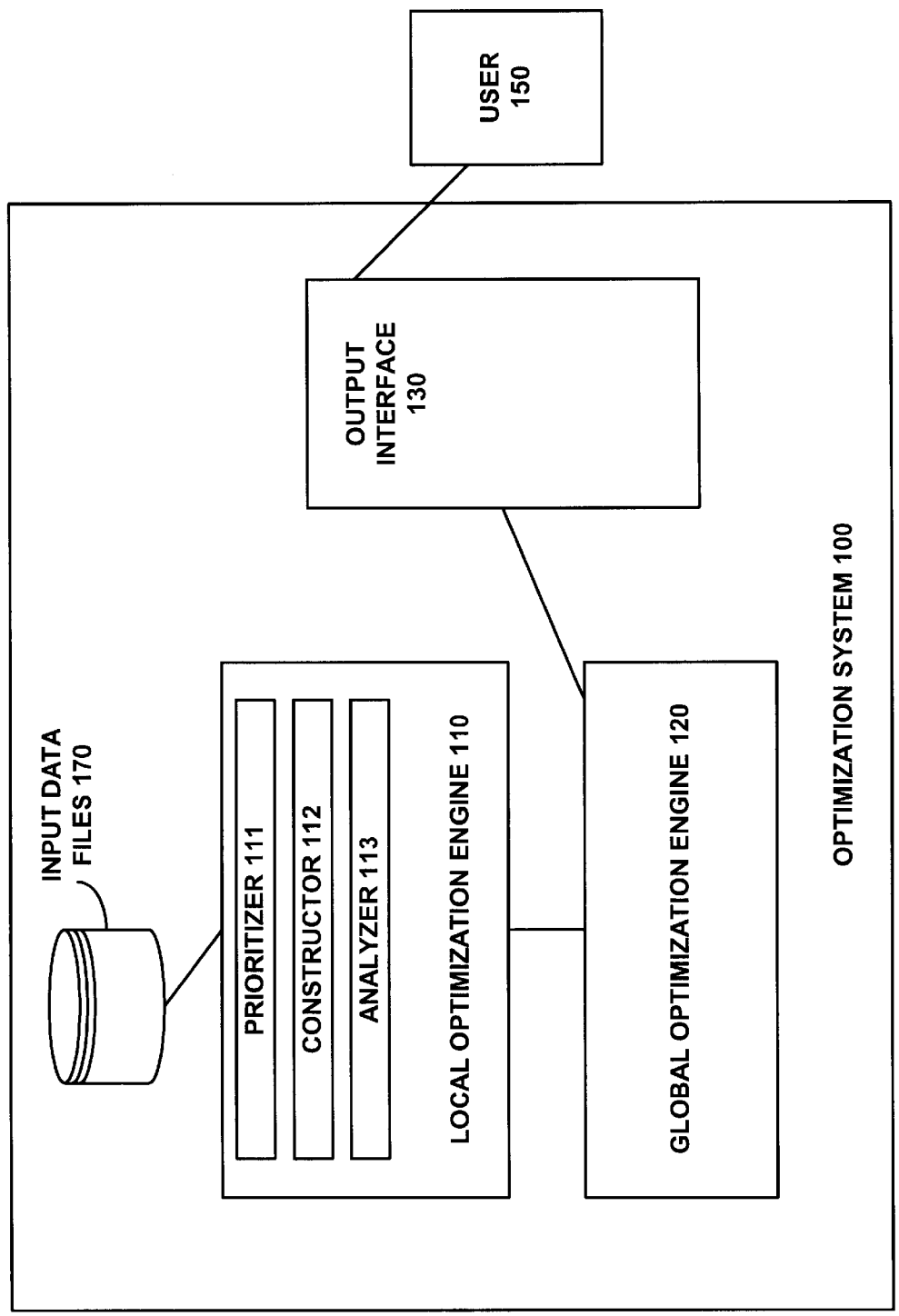
FIG. 1 is a block diagram showing an optimization system in accordance with the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

In a preferred embodiment, the various subsystems illustrated in the figures and discussed herein are implemented by software controlling one or more general purpose computers, as described herein. In a preferred embodiment, such software is stored in a conventional data storage device (e.g., disk drive subsystem) and is conventionally transferred to random access memory of the computer(s) as needed for execution.

For purposes of illustration, an embodiment is illustrated for processing the following multi-job, parallel machine scheduling problem with lateness and changeover costs originated in a fiber-optic cable plant. A cable consists of up to 216 optical fibers. The sheathing operation involves joining the fibers and wrapping a protective rubber sheathing around them. This operation can be performed on one of 13 parallel sheathing lines.

Typically, the number of cables in the set of orders is much larger than the number of sheathing lines. Every ordered cable has a release time and a due date. Production cannot begin before the release time, and the objective function includes a penalty for not completing a cable by the due date.

The production lines are heterogeneous in the types of cables they are able to produce, and the speeds at which they operate. For each cable, only a subset of the production lines will be compatible, and the time required to produce the cable will depend on which of the compatible lines is selected.

In this example problem, job preemption is not allowed, i.e. once a cable has started processing on a line, it finishes without interruption.

The goal is to make two types of decisions, namely how to assign elements, in this case cables, to resources, in this case lines and how to sequence the elements assigned to each resource. In this example, elements are referred to as "jobs" and resources are referred to as "lines." The objectives are minimization of the number of late jobs and minimization of the sum of the setup times between jobs. This is a strongly NP-hard combinatorial optimization problem, and those skilled in the art will recognize that a system for processing such a problem may be readily adapted to a variety of other optimization problems. The systems and processes described herein are very general, and should be applicable to a wide range of problems. The preferred embodiment discussed herein concerns merely one particular scheduling problem that arises in fiber-optic cable manufacturing.

The overall approach used in the preferred embodiment is to formulate the problem as an IP and to solve it by a branch-and-bound technique. Hence we need a "good" IP formulation, an efficient method for solving the linear programming (LP) relaxation, and a process to generate integral solutions.

One concept of modeling discrete optimization problems with complicated constraints that has been shown to work well in practice is known as set partitioning (SP). Suppose we assign schedules to lines (rather than single jobs). Let a line schedule be a feasible assignment of a group of jobs to a line, including a sequencing and the associated objective cost. Notice that the computation of the objective function value of one line is independent of all other lines. To solve the problem, we need to find a min-cost subset of the set of all line schedules that uses each line at most once and includes each job in exactly one line schedule.

Let $x_{l_m}$ be the 0/1 decision variable which is 1 if line schedule l is assigned to line m. Associated with this variable will be a column $a_{l_m}$ representing:

A set of jobs assigned to line m, represented by 0/1 indicators $aj_{l_m}$, which are equal to 1 if job j is in line schedule l and 0 otherwise. Column $a_{l_m} = aj_{l_m}$ will then be the characteristic vector of the jobs in line schedule l for line m.

An ordering of that set resulting in a cost $c_{l_m}$ associated with that line schedule. For a given set of jobs, we would ideally like to find a line schedule that minimizes $c_{l_m}$, but solving this problem is NP-hard, and in practice we usually must apply heuristic methods.

This leads to the SP problem Minimize $$\sum_{m \in M} \sum_{l \in L_m} c_{l_m} x_{l_m}$$

subject to $$\sum_{m \in M} \sum_{l \in L_m} a_{l_m}^j x_{l_m} = 1 \ \forall j \in J$$

$$\sum_{l \in L_m} x_{l_m} \leq 1 \ \forall m \in M$$

$$x_{l_m} \in \{0, 1\} \ \forall l \in L_m, m \in M$$

where $L_m$ is the set of feasible line schedules for line m, J is the set of jobs, and M is the set of available production lines.

The SP formulation comprises two types of constraints. The first forces the solution to the scheduling problem to include each job exactly once. The second makes sure that for each line at most one line schedule can be part of the solution. Note that the constraints that determine whether or not a line schedule is feasible are not represented in the SP formulation; since only feasible line schedules are generated by the heuristic solver, the SP formulation does not need to take these constraints into account.

Although fairly large instances of SP problems can be solved efficiently, the algorithmic challenge is to devise methods for solving SPs with a huge number of columns. In our scheduling problem, the SP has a column for every possible line schedule for every line. The number of such columns is generally exponential in the number of jobs. Fortunately, as explained below, it is possible to approximate the SP so that only a relatively small number of line schedules are considered.

Referring now to FIG. 1, in a preferred embodiment, an optimization system 100 combines Integer Programming (IP) for global optimization, and heuristic search techniques. In operation, system 100 captures the most desirable features of each. A heuristic local optimization engine 110 generates a large number of good feasible solutions quickly, and the global optimization engine 120 employing an IP solver is then used to combine the elements from those solutions into a better solution than the local search engine 10 was able to find. A storage device holding input data files 170 provides the input information for processing by system 100, and an output interface 130 permits conventional presentation of processing results to a user 150. Those skilled in the art will readily note that output interface 130 may also be used to direct operation of other equipment, for example to automatically configure manufacturing equipment for operation in accordance with a schedule determined by optimization system 100.

The heuristic local optimization engine 110 generalizes and combines several existing, highly effective scheduling processes. The generalization is based on two principles: (1) local search benefits from the ability to make large, coherent moves in the search space, and (2) good solutions can be "taken apart" to reveal structure in the (local) search space.

Some of the most effective approaches for solving systems of constraints in recent years have been based on local search. For example, the GSAT and WSAT systems described in the Selman, Levesque and Mitchell reference and the Selman, Kautz and Cohen reference, respectively, apply local search techniques to SAT solvers, and WSAT has been used as the solver for the SATPLAN planning system disclosed in the Kautz and Selman reference cited above. The Doubleback Optimization process used in the scheduling technology developed at the University of Oregon's Computational Intelligence Research Laboratory, disclosed in the Crawford reference cited above, performs a kind of local search to improve a "seed" schedule over a number of iterations. A commercial scheduler called OPTIFLEX from i2 Technologies of Irving Tex., as described in U.S. Pat. No. 5,319,781 referenced above, is based on an approach that uses genetic algorithms.

The Doubleback algorithm produces good results in many circumstances, but is limited when the objective is not limited to just minimizing makespan. In a problem domain such as presented here, a different objective function, using a weighted sum of several factors, is called for. Problems of this sort also involve constraints that are more complex than could be handled by the current Doubleback technique.

Thus, local optimization engine 110 includes a different structure. Specifically, local optimization engine 110 includes a prioritizer 111, a constructor 112, and an analyzer 113. Prioritizer 111 generates a sequence of jobs, with higher "priority" jobs being earlier in the sequence, and uses feedback from analyzer 113 to modify previously generated sequences. Constructor 112 creates a schedule, given a sequence of jobs, by using "greedy" scheduling for each job, in the order they occur in the sequence, without backtracking. Analyzer 113 analyzes a schedule created by constructor 112 to find the trouble spots with the schedule, and provides corresponding feedback to prioritizer 111.

This approach is referred to herein as "Squeaky Wheel" Optimization (SWO), from the aphorism "The squeaky wheel gets the grease." On each iteration, analyzer 113 determines which jobs are causing the most trouble in the current schedule, and prioritizer 111 ensures that constructor 112 gives more attention to those jobs on the next iteration.

In a preferred embodiment, analyzer 113 "assigns blame" to each of the jobs in the current schedule. For each job, the minimum possible cost that each job could contribute to any schedule is determined. For example, if a job has a release time that is later than its due date, then it will be late in every schedule, and the minimum possible cost already includes that penalty. The minimum possible setup costs are also included. Then, for a given schedule, the penalty assigned to each job is its "excess cost," the difference between its actual cost and its minimum possible cost. The setup time penalty for each pair of adjacent jobs is shared between the two jobs, and the penalty for lateness is charged only to the late job itself.

Once these penalties have been assigned, prioritizer 111 modifies the previous sequence of jobs by moving jobs with high penalties forward in the sequence. In a preferred embodiment, prioritizer 111 moves jobs forward in the sequence a distance that increases with the magnitude of the penalty, such that to move from the back of the sequence to the front, a job must have a high penalty over several iterations. However, it should be noted that in practice, sorting the jobs by their assigned penalty is simpler, and turns out to be almost as effective. As a job moves forward in the sequence, its penalty will tend to decrease, and if it decreases sufficiently the job may then tend to drift back down the sequence as other jobs are moved ahead of it. If it sinks too far down the sequence, of course, its penalty may tend to increase, resulting in a forward move. In a preferred embodiment, prioritizer 111 also uses limited randomization to introduce some noise into how far a job is moved in the priority sequence.

Constructor 112 builds a schedule by adding jobs one at a time, in the order they occur in the sequence. A job is added by selecting a line, and a position relative to the jobs already in that line. A job may be inserted between any two jobs already in the line, or at the beginning or end of that schedule, but changes to the relative positions of the jobs already in the line are not considered. Each job in the line is then assigned to its earliest possible start time, subject to the ordering, i.e., a job starts at the minimum of either its release time, or immediately after the previous job on that line, with the appropriate setup time between them.

For each of the possible insertion points in the schedule, relative to the jobs already in each line, constructor 112 calculates the effect on the objective function, and the job is placed at the best-scoring location. Ties are broken in a predetermined manner, which in a preferred embodiment is random selection. After all of the jobs in the sequence have been placed, constructor 112 tries to improve on the completed schedule with a small amount of local search. In a preferred embodiment, local optimization engine 110 only considers reordering jobs within a line, but in other embodiments, broader reordering could be considered.

The constructor need not produce complete or feasible solutions. For example, not all problem elements need to be included in a solution, or resources may be overallocated in a solution. In such cases, the analyzer would model these violations as costs and would assign higher blame to problem elements that are not included in the solution, or to problem elements that use overallocated resources.

The design of the local search engine 100 was influenced by two key insights:

Good solutions can reveal problem structure. By analyzing a good solution, local optimization engine 110 can often identify elements of that solution that work well, and elements that work poorly. A resource that is used at full capacity, for example, may represent a bottleneck. This information about problem structure is local, in the sense that it may only apply to some part of the search space currently under examination, but may be extremely useful in helping figure out what direction the search should go next.

Local search can benefit from the ability to make large, coherent moves. It is well known that local search techniques tend to become trapped in local optima, from which it may take a large number of moves to escape. Random moves are a partial remedy, and in addition, most local search algorithms periodically just start over with a new random assignment. While random moves, small or large, are helpful and are used in limited fashion by system 100 as described above, optimization system 100 works, in part, because of its ability to also make large coherent moves. A small change in the sequence of tasks generated by prioritizer 111 may correspond to a large change in the corresponding schedule generated by constructor 112. Exchanging the positions of two tasks in the sequence given to constructor 112 may change the positions of those two tasks in the schedule, and, in addition, allow some of the lower priority tasks, later in the sequence, to be shuffled around to accommodate those changes. This is a large move that is "coherent" in the sense that it is similar to what one might expect from moving the higher priority task, then propagating the effects of that change by moving lower priority tasks as well. This single move may correspond to a large number of moves in a search algorithm that only looks at local changes to the schedule, and may thus be difficult for such an algorithm to find.

Real, as opposed to academic, optimization problems, often exhibit significantly complex constraints and objective functions. One advantage to local search techniques is that, because no backtracking is required, the mechanism for handling constraints can be kept very simple. To a large extent, the above modules can be defined using "black box" functions that just test for feasibility and perform other simple manipulations, thus isolating the code that understands the specific constraints from the code that implements the above architecture.

System 100 can be thought of as searching two coupled spaces: the space of solutions, and the space of job sequences. Note that in the space of job sequences, the only "local optima" are those in which all jobs are assigned the same penalty, which in practice does not occur. Because of this, system 100 tends to avoid getting trapped in local optima in the solutions generated by constructor 112, since analysis and prioritization will always (in practice) suggest changes in the sequence, thus changing the solution generated on the next iteration. The randomization used in tie breaking and prioritization will also tend to help avoid local optima.

System 100 provides a general structure for processing optimization problems, and can be configured to employ various known techniques as may be appropriate for a particular task. For example, the Doubleback and OPTI-FLEX techniques discussed herein may provide specific implementations usable in optimization system 100.

The importance of prioritization in greedy algorithms is not, in and of itself, a new idea. The "First Fit" algorithm for bin packing, for example, relies on placing items into bins in decreasing order of size. See the Garey and Johnson reference cited above. Another example would be the Greedy Randomized Adaptive Search Procedure (GRASP) disclosed in the Feo and Resende reference cited above. However, these existing schemes all differ from optimization system 100. For example, the prioritization and construction aspects are closely coupled in GRASP. After each element (here, a task) is added to the solution being constructed (here, a schedule), the remaining elements are re-evaluated by some heuristic. Thus the order in which elements are added to the solution may depend on previous decisions. Additionally, the order in which elements are selected in each trial is determined only by the heuristic (and randomization), so the trials are independent. GRASP has no mechanism analogous to the dynamic prioritization used in SWO, and consequently lacks the ability to search the space of sequences of elements, whereas optimization system 100 allows the local optimization engine 110 to make large, coherent moves.

Optimization system 100 is applicable to both the single-line subproblem of generating new columns for an IP solver, and to the solution of the full scheduling problem. As described herein, system 100 is used for solving the full problem; these solutions are also used to generate the initial set of columns for an LP/IP solver.

In a preferred embodiment, the analysis and feedback described above are very simple. It should be recognized that various modifications can be made to prioritizer 111, constructor 112, and analyzer 113 to improve performance in particular situations. For example, the construction of schedules could take various heuristics into account, such as preferring to place a job in a line that has more "slack," all other things being equal.

In a preferred embodiment, local optimization engine 110 generates as many good schedules as it can within a specified time limit. In a preferred embodiment using a Sun Microsystems Sparcstation 10 to implement system 100, the time limit is based on the number of jobs being scheduled, with approximately 20 minutes (1200 seconds) being allowed for a problem involving about 300 tasks. Each of these schedules contains one line schedule for each production line. Each individual line schedule becomes a column in the LP/IP formulation of a set partitioning problem, as previously discussed. Global optimization engine 120 is then used to find the optimal combination of columns. In a preferred embodiment, global optimization engine 120 uses a branch-and-bound solver, and more specifically a general purpose mixed integer optimizer known as MINTO that can be customized to exploit special problem structure through application functions. The MINTO optimizer is disclosed in greater detail in the Nemhauser, Savelsbergh and Sigismondi reference cited and incorporated by reference above. Also in a preferred embodiment, master problems, discussed below, are solved using the CPLEX general purpose LP solver from CPLEX Optimization, Inc., also referenced above. The local optimization engine 110 provides an initial set of columns to the LP relaxation at the root node so that a feasible solution to the LP relaxation is assured.

In a preferred embodiment, the MINTO optimizer is used only for the re-combination of columns generated by SWO, but it should be apparent that system 100 in an alternate embodiment also allows for introduction of new columns in response to the solutions produced by MINTO.

To solve the LP relaxation of SP, called the master problem, global optimization engine 120 uses, in a preferred embodiment, Dantzig-Wolfe column generation as disclosed in the Dantzig and Wolfe reference cited above. Accordingly, the LP is determined in global optimization engine 120 with all of its rows, but not all of its columns, present. The LP relaxation of SP including only a subset of the columns is called the restricted master problem. There are two ways in which columns can be introduced into the LP. In a preferred embodiment, local optimization engine 110 provides an initial set of columns to the LP for processing in global optimization engine 120. This resulting LP is then solved to optimality. In an alternate embodiment, new columns are incrementally added to the LP based on feedback from the LP solver of global optimization engine 120. In such an alternate embodiment, the same heuristic techniques that are currently used to generate the initial seed columns are used in generating additional columns. The problem of generating new columns from a current optimal LP solution is called the subproblem or pricing problem.

Given an optimal solution to the current LP restricted master problem, the dual price for each job j determines how expensive it is for the current solution to cover job j. The idea of column generation is to use these dual prices to determine which jobs should be included in "good" new columns for the master problem. For each line, the system needs to solve a different subproblem. The subproblems differ because the lines are compatible with different subsets of the jobs, and because the time to complete a job depends on which line it runs on.

When solving subproblems, the system must evaluate or "price" candidate columns. Only candidate columns corresponding to feasible line schedules need to be evaluated, i.e., a requirement is imposed that all jobs included can run on that line. If a column is found whose cost $c_{lm}$ is smaller than the sum of the dual prices of the jobs covered by that column, it is a candidate to enter the master problem. Such a column is said to have a negative reduced cost. If no such column exists for any of the lines, the current solution to the master problem is optimal.

If the subproblems to optimality can be solved quickly, we would then have a fast LP solver which could then be embedded into a branch-and-bound algorithm for solving the entire scheduling problem, as in optimization system 100. However, in the example illustrated herein, the subproblems, while being easier than the original problem, are still NP-hard and a very large number of them need to be solved. Therefore, optimization system 100 solves the subproblems heuristically and stops generating columns when the heuristic processing of local optimization engine 110 terminates. This implies that the best solution to the LP master problem may not give a true lower bound. Thus, by using this approximate lower bound in the branch-and-bound phase of the operation of system 100, one cannot guarantee that an optimal solution will be found to the entire scheduling problem.

In practice, it is found that AI techniques are in fact better at producing new columns than are conventional OR methods, but it is apparent that even with better new column generation, there are several aspects of the "conventional wisdom" that are fundamentally incorrect. They include:

1. The LP/IP engine can overcome the problems that arise from generating subproblem solutions in isolation from each other.
2. The problems are too complex to hope to generate good total solutions using heuristic methods; it is much easier to break the problem into subproblems and then solve the subproblems in isolation.
3. Search algorithms should strive to produce columns with the most negative reduced cost.
4. The majority of effort should be expended on new column generation, rather than on producing good initial seeds.
5. Adding a positive reduced cost column to the LP/IP engine will not move it closer to a solution. These assumptions are discussed in detail in the following paragraphs.

As to the first assumption, the problems associated with solving only subproblems completely overwhelm the efficiency of the LP/IP engine on large problems, and greatly slows it down on small problems.

When the entire problem is solved as a whole, the interactions between subproblems are handled much better. Subschedules produced as part of a total schedule tend to have groupings of jobs that are more efficient because the scheduler can see all of its options when deciding where to place jobs.

When generating whole solutions heuristically, it is unlikely that any generated solution will be optimal. However, if the heuristic is close to accurate then it is likely that some parts of the total solution (i.e., some of the schedule's subschedules) will be optimal or near-optimal. Each generated schedule may have a different set of weak and strong points.

Furthermore, since all of the generated schedules are built using the same heuristics, (with some randomization) it is likely that parts of the many generated schedules will be interchangeable. This interchangeability of subproblem solution among schedules is exactly what the LP/IP engine needs and is exactly what the isolated subproblem solutions do not tend to give it.

With this new knowledge, this assumption could now be rephrased as: Poor interactions between subproblem solutions that are generated in isolation from each other are more than an LP/IP engine can overcome. This approach simply does not give the LP/IP engine the proper building blocks to work with.

As to the second enumerated assumption, it turns out that solving the subproblems is almost as hard as the total problem. The code does not have to decide on which line every job runs but it does have to decide which jobs will run on the line currently under consideration. Because each subproblem is isolated from the others to reduce the problem complexity it is very difficult to tell which jobs run best on the line under consideration. As a result, fairly uninformed choices are made and very suboptimal subproblem solutions are often produced.

When solving full problems the solver has to deal with the increased complexity of the full problem, but it is able to make much better informed decisions because it can see the whole picture. When solving the full problem each decision takes more effort, but far fewer bad decisions are made. This tradeoff works in favor of full solutions. Thus, the second assumption may be restated as:

The increase in the quality of decision making that results from solving the whole problem, and therefore being able to see the whole problem, more than makes up for the increased complexity of solving the problem rather than its subproblems.

Concerning the third enumerated assumption, in new column generation, whether in isolation or using full solutions, each subsolution has a reduced cost associated with it. The reduced cost is the actual cost of the subschedule in terms of time materials, labor, etc., plus the dual values for each job in the subschedule. A dual value indicates how much difficulty the most recent pass of the LP/IP engine had with a given job. Negative dual values indicate a difficult job for the engine to schedule; positive values indicate an easy job for the engine to schedule. The magnitude of a dual value indicates how easy or difficult the job was to schedule in the latest solution.

Linear programming theory states that giving the LP/IP engine new columns, or subschedules in this case, that have a negative reduced cost will move the LP/IP engine closer to an optimal solution, although possibly only by an infinitesimally small amount.

Conventional OR wisdom says that producing new columns that have maximally negative reduced cost will move the LP/IP engine towards a better solution the fastest.

However, such an approach is actually a bad idea. The important thing is to generate high quality subsolutions that have a negative reduced cost of any magnitude, rather than to generate subsolutions that have the most negative reduced cost, but not necessarily the highest quality.

Pursuing the most negative reduced cost tends to create subsolutions that will never be used in a final good solution. Jobs that run on different lines in any good schedule are forced onto the same line because they have very negative dual values. If maximally negative reduced cost is the goal then the magnitude of such jobs' negative dual values masks the fact that they are a bad combination. Accordingly, this assumption should be restated as:

Search algorithms should generate high quality subsolutions that have a negative reduced cost of any magnitude, rather than generate subsolutions that have the most negative reduced cost, but not necessarily high quality.

As to the fourth enumerated assumption, the reasoning behind such an assumption is that new column generation is able to benefit from the exact mathematical feedback that is provided by each call to the LP/IP engine (in the form of dual values). When generating seeds, that exact mathematical feedback is not available because the LP/IP engine has not been called yet. Without dual values to guide the search, seed generation will be relatively undirected and tend to produce low quality schedules.

It turns out that access to dual values is not nearly as important as originally thought. Good search techniques, such as SWO, are capable of determining what parts of the problem are presenting the most difficulty, and then using that information to produce better solutions.

In the scheduling domain, approximately equally good solutions are being produced by generating a large number of seed schedules, versus producing a minimal number of seed schedules and then generating future schedules with guidance from dual values. Which approach works better seems to depend on the problem instance.

In cases where only seed schedules are generated, the entire benefit of the LP/IP engine is in its ability to recombine parts of the different seed schedules into a better total schedule than any of the seeds. Thus, this assumption is restated as:

A good search algorithm can match, and sometimes surpass, the effectiveness of using dual values to guide a search.

Concerning the fifth and final enumerated assumption, in practice it is found that adding positive reduced cost columns can in fact move the LP/IP engine closer to a solution. There are two distinct cases:

A positive column is picked up by the LP/IP engine immediately after it is added and appears in the next LP/IP solution, improving it by some amount.

A positive column does not appear in the next LP/IP solution, but does appear in a subsequent LP/IP solution, improving it by some amount.

In the first, immediate payoff case, the positive column is always used in conjunction with other columns that were just added. The sum of the reduced costs of the newly added and used columns is always negative. A negative reduced cost column is being added in this case, but it is only useful in conjunction with other columns that have, at this time, positive reduced cost. If the positive columns were not added at the same time, then the LP/IP engine would have to move into the search space where those columns do in fact have negative reduced cost. This may or may not happen before running out of time, and even if it does, the search may not succeed in reproducing those same columns.

A similar situation is happening when new positive reduced cost columns are not immediately useful, but are useful in the long run. In this case the search is effectively leaping ahead and producing columns that have eventually would have negative reduced cost anyway.

In view of the above, alternate embodiments of global optimization engine 120 effectively make use of the following processes:

Generating full solutions using dual values to generate new columns.

Spending all allocated time in generating full seed schedules, and then using an LP/IP engine to recombine them without any new column generation.

Providing positive reduced costs subproblems (i.e., line schedules) to an LP/IP engine to speed up searching.

Thus, it is found that by employing techniques that run counter to the conventional wisdom of Operations Research, optimization system 100 can provide benefits not previously available. Specifically:

Solving the whole problem in an integrated fashion is advantageous over breaking the problem into subproblems and then solving each subproblem in isolation.

Producing new columns with the most negative reduced cost is in fact a bad idea; producing new columns that are high quality and have any negative reduced cost is found to be more advantageous.

Feeding positive reduced cost columns to an LP/IP engine can in fact speed up the search for a better solution.

In practice, it is found that a system as described herein, i.e., one that uses the best schedules produced by an SWO technique as an initial set of columns in an IP formulation, provides performance advantages over the following approaches:

TABU search, which is a local search algorithm in which moves that increase the cost are permitted to avoid getting trapped at a local optimum. To avoid cycling, when an "uphill" move is made, it is not allowed to be immediately undone.

full SWO search, which applies the SWO architecture to the entire problem, running for a fixed number of iterations and returning the best schedule it finds.

In sum, a combined exact and heuristic optimization approach allows a large number of good (and not so good) schedules to be "taken apart and recombined" in a way that quickly results in a higher quality schedule.

This hybrid approach takes advantage of the relative strengths of each part: local search is able to find good schedules, but tends to get stuck in local optima, and IP techniques provide a kind of global optimization that has no counterpart in local search. In a given solution, the local search approach may get some things right, and some things wrong, but the parts that are handled badly in one solution may be handled well in another. In a sense, global optimization allows the best parts of the different solutions to be combined.

Within SWO, we can allow randomization to occur in any of the three main modules. In an alternate embodiment, a branch-and-price technique is used in which randomized heuristics are employed to generate new columns throughout the search tree.

Applying local search techniques for column generation may improve performance still further. The intuition behind this is that the dual values provided by the LP solver may provide valuable feedback to the local optimization engine 110 about which tasks are "most critical." This can provide a bias toward different (and hopefully useful) areas of the search space. Thus, in an alternate embodiment, feedback from the global optimization engine 120, and particularly the MINTO processing results, may be very useful to the local optimization engine 110, particularly in the SWO aspect.

Figure 2:
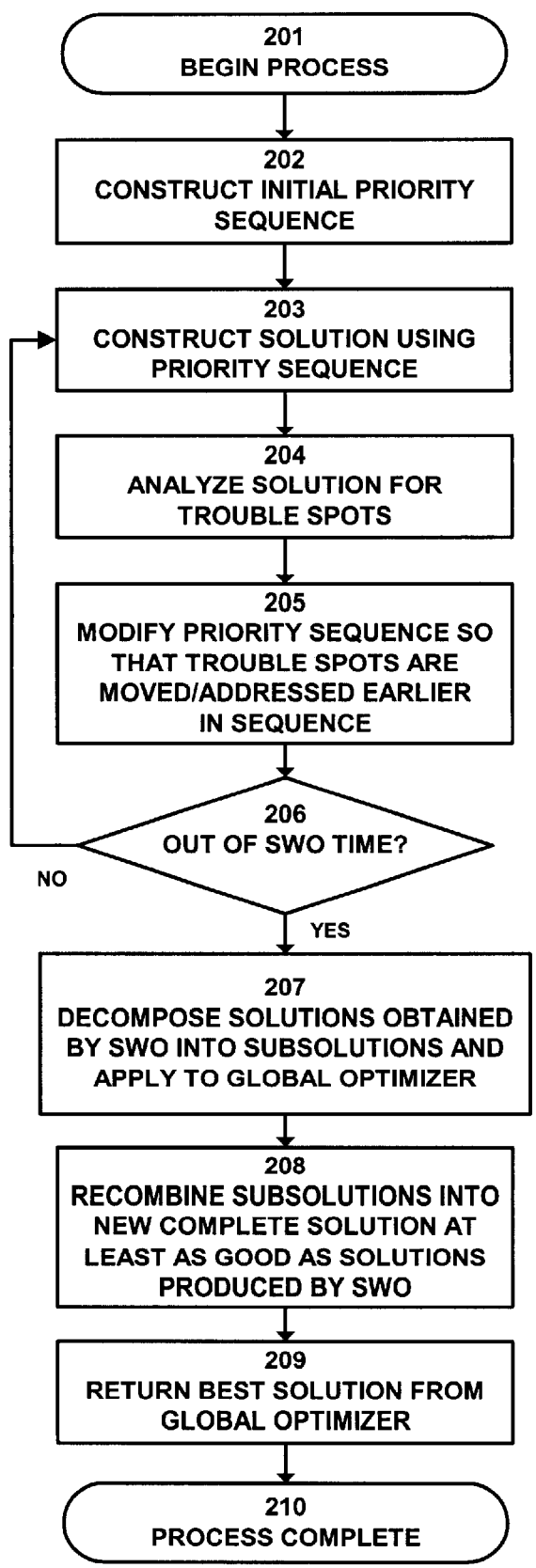
FIG. 2 is a flow diagram illustrating processing in accordance with the present invention.

Referring now to FIG. 2, there is shown a flow diagram of processing in accordance with the present invention. As a first step after processing begins 201, an initial priority sequence is constructed 202. A solution is then constructed 203 using that priority sequence, that solution is analyzed 204 for trouble spots as described above, and the priority sequence is modified 205 so that the trouble spots are moved/addressed earlier in the sequence. A determination is then made 206 to see whether a predetermined time limit has been exceeded for this SWO processing; if not, further SWO processing is iteratively performed commencing with 203. Otherwise, SWO processing is complete and processing continues. It should be noted that in some circumstances, SWO processing alone as set forth in 201–206 may be employed, in which case processing would terminate at this point.

However, as illustrated in FIG. 2, where global optimization is also used, the solutions obtained by SWO processing are decomposed 207 into subsolutions and applied to a global optimizer, e.g., global optimization engine 120. The decomposition of a solution into subsolutions can be based on any number of things. For example, resources, time, and problem element characteristics can be used to decompose solutions into subsolutions.

Next, the applied subsolutions are recombined 208 into new complete solutions that are at least as good as those produced by the SWO processing 201–206. The best of these solutions is then returned 209 from the global optimizer, and processing then terminates 210. Thus, the global optimization processing 207–210 uses the solutions produced by SWO processing in an attempt to improve on those solutions. In this example, overall processing may be characterized as SWO followed by global optimization.

In an alternative embodiment, SWO processing is performed on the subsolutions to generate improved subsolutions. This SWO processing can be performed independent of whether SWO is being used in combination with global optimization processing 207–210.

Figure 3:
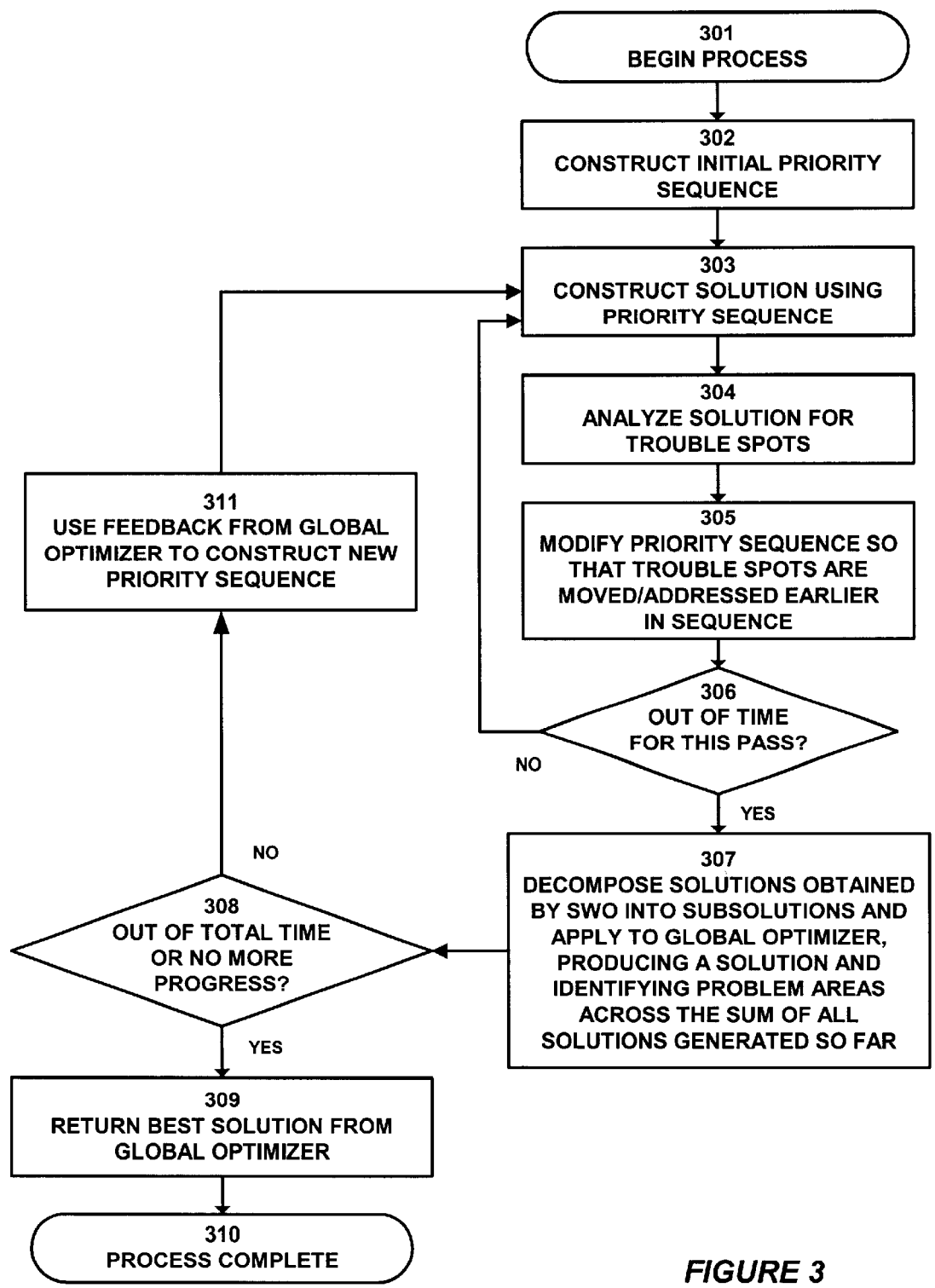
FIG. 3 is another flow diagram illustrating processing in accordance with the present invention.

Referring now to FIG. 3, there is shown yet another flow diagram of processing in accordance with the present invention, this time using SWO processing iterating with global optimization processing. In this instance, processing 301–305 is identical to that described in connection with processing 201–205 of FIG. 2. Next, a determination 306 is made to see whether time has expired for a particular "pass" at SWO processing. If not, SWO processing continues at 303 as previously described. Otherwise, the solutions obtained by SWO processing are decomposed 307 into subsolutions and applied to a global optimizer, which then produces a solution and further identifies problem areas across the sum of all solutions generated so far. Next, another determination 308 is made to see whether a total processing time has expired, as well as whether no further progress appears to have been made. If more time remains and progress has been shown, the feedback obtained in 307 is used to generate 311 a new priority sequence, with problem areas occurring earlier in the sequence, processing reverts to 303 for further SWO processing followed by global optimization. Otherwise, the best solution from the global optimizer is returned 309 and processing terminates 310. Thus, in this embodiment, the SWO optimization and the global optimization are interactive.

From the above description, it will be apparent that the invention disclosed herein provides a novel and advantageous optimization system and process using global and local techniques. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention.

We claim:

1. A method of generating cost-optimized solutions to an optimization problem, comprising the steps of:

receiving data representative of the optimization problem, the received data representative of a set of elements for assignment and a set of resources to which the elements can be assigned;

representing the elements in a prioritized list;

constructing an assignment of the elements in the prioritized list to the resources such that every resource is assigned a subset of elements in a highest-priority-first order, wherein the assignment forms a solution;

analyzing the solution to determine an excess cost for each element in the solution;

iterating the constructing and analyzing steps, and, with each iteration, elevating a priority of an element in the prioritized list by an amount determined responsive to the excess cost for that element to produce a plurality of solutions to the optimization problem; and outputting data representative of the plurality of solutions to the optimization problem.

2. The method of claim 1, wherein the analyzing step comprises the steps of:

determining a minimum possible cost that each element can contribute to any solution;

determining an actual cost for each element based in part on the element's position in the solution; and determining the element's excess cost from the element's minimum possible cost and the element's actual cost.

3. The method of claim 1, wherein the iterating step further comprising the steps of:

decomposing each of the plurality of solutions into a plurality of subsolutions.

4. The method of claim 3, further comprising the step of:

passing the plurality of subsolutions to a linear programming/integer programming (LP/IP) engine;

wherein each subsolution is a column in the LP/IP formulation of a set partitioning problem.

5. The method of claim 1, wherein the constructing step comprises the steps of:

representing the elements in a prioritized list; and assigning the elements in the prioritized list to the resources in a highest-priority-first order.

6. The method of claim 5, further comprising the step of:

elevating a priority of an element by a distance that increases with a magnitude of an excess cost of the element.

7. The method of claim 1, wherein the constructing step comprises the step of:

greedily assigning elements to resources.

8. The method of claim 1, wherein computer instructions for performing the method steps are embodied on a computer-readable medium.

9. A computer-readable medium having computer program instructions embodied thereon for directing a computer to perform steps for generating cost-optimized solutions to an optimization problem, the steps comprising:

receiving data representative of the optimization problem, the received data representative of a set of elements for assignment and a set of resources to which elements can be assigned;

representing the elements in a prioritized list;

constructing an assignment of the elements in the prioritized list to the resources in a highest-priority-first order such that every resource is assigned a subset of elements, wherein the assignment forms a solution;

analyzing the solution to determine an excess cost for each element in the solution;

iterating the constructing and analyzing steps to produce a plurality of solutions to the optimization problem;

with each iteration, elevating a priority of an element in the prioritized list by an amount determined responsive to the excess cost for that element; and outputting data representative of the plurality of solutions to the optimization problem.

10. The computer-readable medium of claim 9, further comprising the step of:

decomposing the solution generated by the constructing step into a plurality of subsolutions, wherein each subsolution includes a subset of elements and a subset of resources;

wherein the assigning and analyzing steps operate on the plurality of subsolutions to generate a plurality of solutions for each subsolution.

11. The computer-readable medium of claim 7, wherein the assigning step comprises the steps of:

representing the subset of elements in a prioritized list; and assigning the elements in the prioritized list to the resources in a highest-priority-first order.

12. The computer-readable medium of claim 9, wherein the analyzing step comprises the step of:

determining a minimum possible cost that an element can contribute to any solution.

13. The computer-readable medium of claim 12, wherein the analyzing step further comprises the step of:

determining an actual cost for the element based in part on the element's position in the solution.

14. The computer-readable medium of claim 13, wherein the analyzing step further comprises the step of:

determining the element's excess cost from the element's actual cost and the element's minimum possible cost.

15. The computer-readable medium of claim 11, wherein the assigning step comprises the step of:

elevating a priority of an element in the prioritized list responsive to a magnitude of an identified excess cost of the element.

16. The computer-readable medium of claim 9, further comprising the steps of:

decomposing the data representative of the plurality of solutions into data representative of a plurality of subsolutions; and processing the data representative of the plurality of subsolutions using linear programming/integer programming (LP/IP) techniques;

wherein the LP/IP techniques produce a plurality of new solutions.

17. A system for iteratively generating cost-optimized solutions to an optimization problem, comprising:

a storage device for storing data representative of the optimization problem and including a set of elements for assignment and a set of resources to which the elements can be assigned;

a prioritizer for storing the elements in a prioritized list and for elevating the priority of an element responsive to a penalty assigned to the element;

a constructor for assigning the elements in the prioritized list, in order of priority, to the resources, wherein a subset of elements is assigned to each resource and the assignments form a solution, and wherein iterations of the system produce a plurality of solutions;

an analyzer for assigning the penalty to each element in the solution and providing the penalties to the prioritizer, wherein the penalty is determined responsive to an excess cost for the element; and an output interface for outputting the plurality of solutions to the optimization problem.

18. The system of claim 17, wherein the prioritizer comprises:
   a module for assigning random initial priorities to the elements in the prioritized list.

19. The system of claim 17, wherein the prioritizer comprises:
   a module for applying a heuristic to assign initial priorities to the elements in the prioritized list.

20. The system of claim 17, wherein the analyzer comprises:
   a module for determining a minimum possible penalty that an element can contribute to any solution.

21. The system of claim 20, wherein the analyzer further comprises:
   a module for determining an element's excess cost from the element's actual penalty and the element's minimum possible penalty.

22. The system of claim 17 further comprising:
   a module for decomposing each of the plurality of solutions output by the output interface into a plurality of subsolutions; and
   a linear programming/integer programming engine for treating each subsolution in the plurality of solutions as a column in a set partitioning problem.

23. The system of claim 17, wherein the prioritizer ranks the elements in the prioritized list in descending order of assigned penalties.

24. The system of claim 17, wherein particular elements are not included in the solution and the analyzer further comprises:
   a module for assigning a penalty to each element not included in the solution, wherein the penalties assigned to elements not included in the solution are higher than the penalties assigned to elements in the solution.

* * * * *

UNITED STATES PATENT AND TRADEMARK OFFICE
CERTIFICATE OF CORRECTION

PATENT NO.    : 6,272,483 B1
DATED         : August 7, 2001
INVENTOR(S)   : David E. Joslin et al.

It is certified that error appears in the above-identified patent and that said Letters Patent is hereby corrected as shown below:

Title page,
Item [56], References Cited, U.S. PATENT DOCUMENTS, add the following:
-- 5,319,781    6/1994  Syswerda ......................... 395/650 --

OTHER PUBLICATIONS, add the following:
-- Lee, J-K; and Kim, Y-D, Search Heuristics for Resource Constrained Project Scheduling. *Journal of the Operational Research Society* (1996), pp. 678-689.

Leon, V.J. and Balakrishnan, R., Strength and Adaptability of Problem-Space Based Neighborhoods for Resource-Constrained Scheduling, *OR Spektrum* (1995), pp. 173-182.

Guéret, C. and Prins, C., Classical and New Heuristics for the Open-Shop Problem - A Computational Evaluation; pp. 1-23.

Pinson, E., Prins, C. and Rullier, F., Using Tabu Search for Solving the Resource-Constrained Project Scheduling Problem, 6 pages. --

Column 17,
Lines 17-21, claim 3 should read:
3.  The method of claim 1, wherein the iterating step further comprising the step[s] of:
     decomposing each of the plurality of solutions into a plurality of subsolutions.
Lines 27-36, claims 5 and 6 are cancelled.

Column 18,
Lines 11-17, claim 11 is cancelled.
Lines 31-35, claim 15 is cancelled.

Signed and Sealed this

Twentieth Day of January, 2004

JON W. DUDAS
*Acting Director of the United States Patent and Trademark Office*